United States Patent
Duc et al.

(10) Patent No.: US 10,628,531 B2
(45) Date of Patent: Apr. 21, 2020

(54) SYSTEM AND METHOD FOR ENABLING TRANSLATION OF SPEECH

(71) Applicants: Billy D. Duc, Briarwood, NY (US); Jeffrey Kriss Zamor, Lake Mary, FL (US)

(72) Inventors: Billy D. Duc, Briarwood, NY (US); Jeffrey Kriss Zamor, Lake Mary, FL (US)

(73) Assignee: Billy D. Duc, New York, NY (US)

( * ) Notice: Subject to any disclaimer, the term of this patent is extended or adjusted under 35 U.S.C. 154(b) by 379 days.

(21) Appl. No.: 15/178,334

(22) Filed: Jun. 9, 2016

(65) Prior Publication Data

US 2017/0357639 A1    Dec. 14, 2017

(51) Int. Cl.
*G06F 17/28* (2006.01)
*G10L 15/26* (2006.01)
*G10L 15/00* (2013.01)

(52) U.S. Cl.
CPC .......... *G06F 17/289* (2013.01); *G10L 15/005* (2013.01); *G10L 15/26* (2013.01); *G10L 15/265* (2013.01)

(58) Field of Classification Search
CPC .... G06F 17/28; G06F 17/2836; G06F 17/289; G10L 15/005; G10L 15/26; G10L 15/265
See application file for complete search history.

(56) References Cited

U.S. PATENT DOCUMENTS

| | | | | |
|---|---|---|---|---|
| 5,696,980 A | * | 12/1997 | Brew | G06F 17/2881 704/273 |
| 2008/0071534 A1 | * | 3/2008 | Johnson | G10L 15/26 704/246 |
| 2008/0162114 A1 | * | 7/2008 | Torres-Rocca | G06F 17/2836 704/7 |
| 2008/0221862 A1 | * | 9/2008 | Guo | G06F 17/289 704/2 |
| 2009/0119091 A1 | * | 5/2009 | Sarig | G06F 17/2836 704/2 |
| 2011/0282647 A1 | * | 11/2011 | Pastore | G06F 17/2836 704/4 |
| 2016/0328387 A1 | * | 11/2016 | Boutcher | G06F 17/27 |
| 2018/0007205 A1 | * | 1/2018 | Klein | H04M 3/5166 |
| 2018/0218729 A1 | * | 8/2018 | Saini | G10L 15/18 |

* cited by examiner

*Primary Examiner* — Eric Yen
(74) *Attorney, Agent, or Firm* — Kushal Malhotra; Malhotra & Malhotra, IP LLP

(57) ABSTRACT

An embodiment provides a system (100) and a method (700) for enabling translation of speech is provided. The system includes an application module (104) configured to receive input identifying a first language of an audio input and a second language into which the audio input in the first language is to be translated. The application module (104) determines the availability of at least one human translator capable of translating the first language into the second language and second language into the first language, in at least one database of human translator. Content, in the second language, which has been translated using the audio input in the first language, is received by the application module (104) from the available human translator. Machine translated content in the second language is received by the application module (104) if the at least one human translator is unavailable.

19 Claims, 9 Drawing Sheets

FIG. 2

SYSTEM AND METHOD FOR ENABLING TRANSLATION OF SPEECH

BACKGROUND

Unless otherwise indicated herein, the materials described in this section are not prior art to the claims in this application and are not admitted to be prior art by inclusion in this section.

FIELD

The subject matter in general relates to language translation services in healthcare, banks, courts and hotels, among other industries. More particularly, but not exclusively, the subject matter is directed to speech translation and transcription in medical or healthcare domain.

DISCUSSION OF RELATED FIELD

There might be several scenarios which require communication between two parties who speak two different languages. In such scenarios, a human translator who has the knowledge of both the languages may enable effective communication between the two parties. Such human translators may be required in many areas of business.

As an alternative to human translators, machine translation may be used. However, machine translation may have several limitations. One of the limitations of machine translation is that machine translation may not always be as accurate as human translation.

In the healthcare industry, patients and healthcare professionals have to communicate effectively; failure to do so may result in undesired consequences. Ensuring effective communication between patients and healthcare professionals, and enabling medical transcription may be challenging when the patient and health care professional communicate in two different languages, wherein the language of one may not be well understood by the other.

The above recited challenges relating to effective communication between patients and healthcare professionals is currently being addressed by healthcare service providers, such as hospitals, by employing medical translators and transcriptionists. However, healthcare service providers may face challenges in employing medical translators and transcriptionists when they have to support multiple languages.

Further, translated medical data and transcripts require storage for easy access of the data and for protection of such data from threats. US20050177312 A1 discloses a medical data recording system and method for real-time storage of medical data received from a plurality of different sources; however it fails to provide real time translation. The issue of real time translator is addressed in US20140278345 A1 as it discloses medical translator system that includes a language selector configured to offer a plurality of selectable language options and receive language option selection. However, the instant reference does not provide means for direct storage into patients Electronic Medical Record (EMR). Furthermore, US20140278345 A1 fails to provide means for a live human translator to make modifications.

Conventional techniques available in the market, for example, Martii™ (My Accessible Real-Time Trusted Interpreter) technology uses database of qualified virtual interpreters on call for real-time translation via video chat sessions, which utilizes a network of qualified translators. However, Martii's technology has shortcomings particularly when a qualified virtual interpreter is offline and cannot provide services. Canopy has a product similar to Martii™ except it is involved in mobile phone app form. Further, Dragon Medical™'s solution to translation of speech provides a system, wherein speech is recorded and transcribed electronically and then saved into records. However, translation of speech (audio) from one language to another is not a part of the solution.

In light of the above recited challenges, the trend in the healthcare industry has been to engage with third party medical translators and transcriptionists entities, which may support multiple languages. Such medical translators and transcriptionists are available over a communication network to the patients and the healthcare professionals. However, in many instances, a medical translator and transcriptionist with the required capabilities may be busy with other translation and transcription engagement when the need arises. In such scenarios, the patient and the healthcare professional will have to wait till the medical translator and transcriptionist is available, which may result in inferior user experience and loss in revenue to the healthcare service provider.

In light of the foregoing discussion, there is a need for an improved technique to enable translation and transcription of communication between two entities who speak two different languages.

SUMMARY

An embodiment provides a system and a method for enabling translation of speech. The system includes an application module. The application module is configured to receive input identifying a first language of an audio input and receive input identifying a second language into which the audio input in the first language is to be translated. The application module further determines the availability of at least one human translator capable of translating the first language into the second language, in at least one database of human translators. Content, in the second language, which has been translated using the audio input in the first language, is received by the application module from the available human translator. Machine translated content in the second language, which has been translated using the audio input in the first language, is received by the application module if the at least one human translator capable of translating the first language into the second language is unavailable.

BRIEF DESCRIPTION OF THE DRAWINGS

Embodiments are illustrated by way of example and not limitation in the Figures of the accompanying drawings, in which like references indicate similar elements and in which:

FIG. 2 is an exemplary user interface 202 of the application module 104 to receive command 204 that initiates translation;

DETAILED DESCRIPTION

Figure 1:
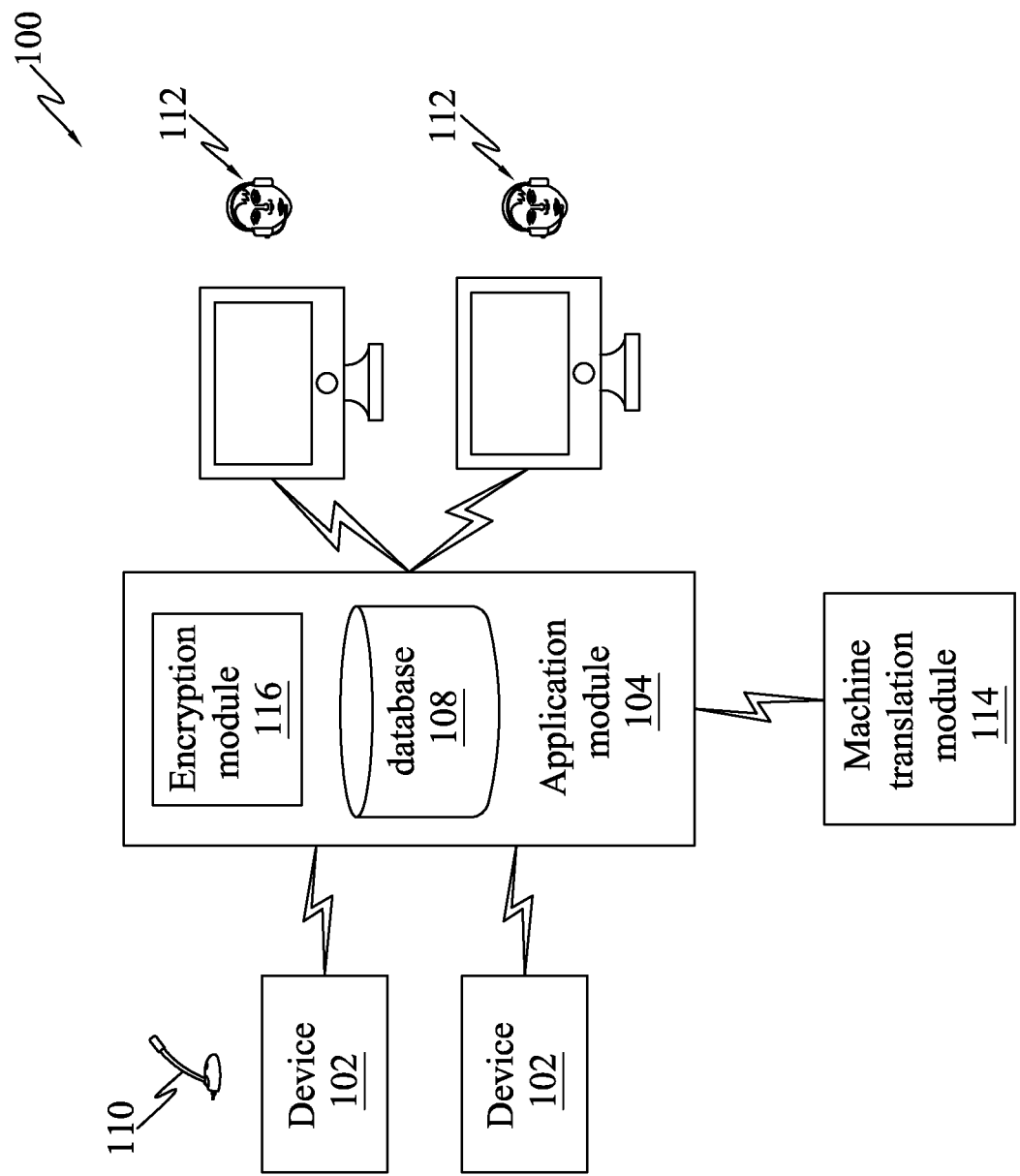
FIG. 1 is an exemplary architecture of an exemplary system 100 for enabling translation of speech.

I. Overview
II. System for Enabling Translation of Speech
III. Method for Enabling Translation of Speech
IV. Conclusion The following detailed description includes references to the accompanying drawings, which form part of the detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

I. Overview

Embodiments provide a technical solution to overcome the problem of waiting for human translators to be available during conversation between two parties who do not understand each other's language. The solution is based on a system configured to search for at least one available source of translation of audio input received in a first language into a second language. The at least one source of translation is a human translator, who is capable of translating the first language into the second language and the second language into the first language. Further, the source of translation may be a human translator capable of communicating in sign language. The system allocates a human translator with the requisite capabilities if the human translator is available. The system also enables selection of one or more alternative sources of translating audio input in the first language to the second language, if a human translator with the requisite capabilities is not available. The additional or alternative sources of translation may be machine translation.

The system is configured to receive input identifying the first language of an audio input and receive input identifying the second language into which the audio input is to be translated. The system is enabled to access a database of human translators to identify human translators with the requisite capabilities. Content, in the second language, which has been translated using the audio input in the first language, is received by the system from an available human translator. Further, if a human translator capable of translating the first language into the second language and translating the second language into the first language is unavailable, machine translated content in the second language, which has been translated by the alternative source, using the audio input in the first language, is received by the system.

II. System for Enabling Translation of Speech

Referring to the figures, more particularly to FIG. 1, an exemplary architecture of an exemplary system 100 for enabling translation of speech is provided. The system 100 includes user device(s) 102, an application module 104, communication interfaces, database of human translators 108, an audio input device 110, human translators' devices 112, machine translation module 114 and an encryption module 116.

As an example of application, the system 100 may be implemented (but not limited to) in the healthcare industry in instances where a patient is unable to communicate with a healthcare professional in the same language as the healthcare professional may speak or understand.

The system 100 may be implemented using any handheld portable device 102 capable of communication. Alternatively, system 100 may be implemented using any non-portable device 102 capable of communication. The device 102 of system 100 includes operating systems, softwares and application programs, web browsers such as Google Chrome® and Firefox®, among others, that may make the device suitable for running at least a portion of the application module 104 on the device 102.

The device 102 of the system 100 includes processors, which return output by accepting signals, such as electrical signals as input. In one embodiment, processors may include one or more processing units (CPUs). The processor(s) may communicate with a number of peripheral devices, such as, the audio input device 110 and other device(s) 102, via, for example, bus system, wired or wireless communication network. The device 102 may also be configured to communicate with remote devices via its communication interface.

The device 102 may include memory that may store data and program instructions that are loadable and executable on processor(s) as well as data generated during the execution of these programs. The memory may be volatile, such as random access memory and/or a disk drive or non-volatile memory.

Examples of the devices 102 of system 100 may include, smart phones, tablets, notebooks, laptop, wearable devices and desktop computers, among other such devices.

Device 102 may host a portion of the application module 104. A portion of the application module 104 may be available in a remote server. The application module 104 includes computer-executable instructions, firmware, or combinations thereof. Computer-executable instruction or firmware implementations may include computer-executable or machine-executable instructions written in any suitable programming language to perform the various functions described.

The application module 104 may provide user interface on the device 102 that may enable communication with the application module 104. The user of the device 102 may be an entity/entities seeking translation of a language spoken by another entity. For example, the user of the device 102 and the entity seeking translation of a language spoken by another entity may be a healthcare professional. The entity speaking the language for which translation is being sought may be a patient, as an example. Alternatively or additionally, a patient may be using another device 102, wherein the patient seeks translation, with transcription in some embodiments, of what is communicated by the healthcare professional.

The user interface of the device 102 may enable a new user, such as a healthcare professional to provide profile information. The profile information may include one or more of the healthcare professional's name, area of specialization, patient history, consultation history, medicines prescribed and languages spoken and understood, among other information. Such information may be saved in the memory of the application module 104, such that, when an existing user logs in, the user only provides the user name and a password.

Figure 2:
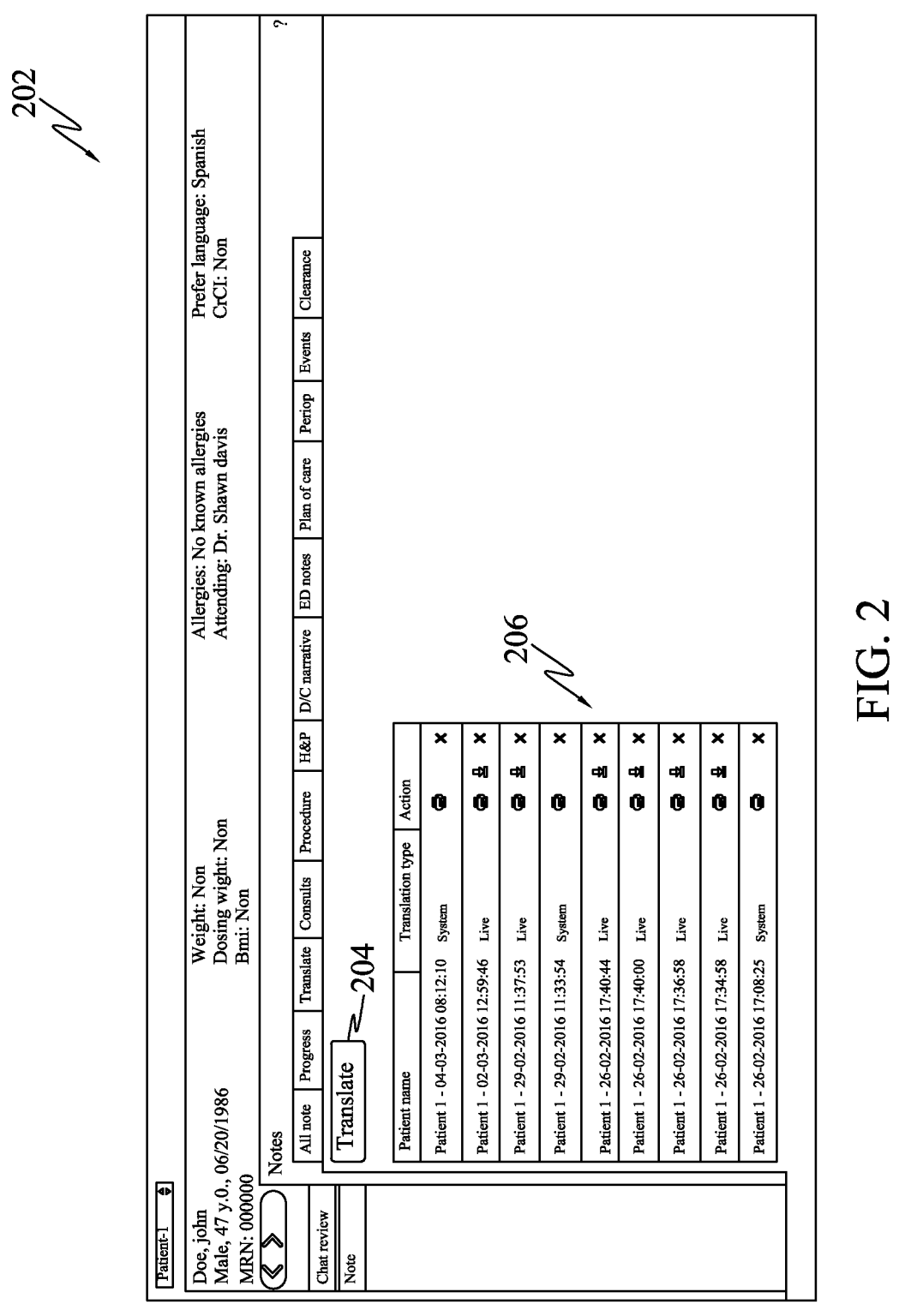

Referring to FIG. 2, the application module 104 may be configured to present an interface 202 to receive command 204 that initiates translation. The user interface 202 may also present or enable access to the patient's history 206. The history 206 may include key information about the patient. Additionally, previous medical transcripts corresponding to the patient may be made available. Furthermore, information/indication corresponding to the means used for translation/transcription during previous sessions with the patient may be presented. Option may be provided to download, print, edit or delete the previous medical transcripts.

Figure 3:
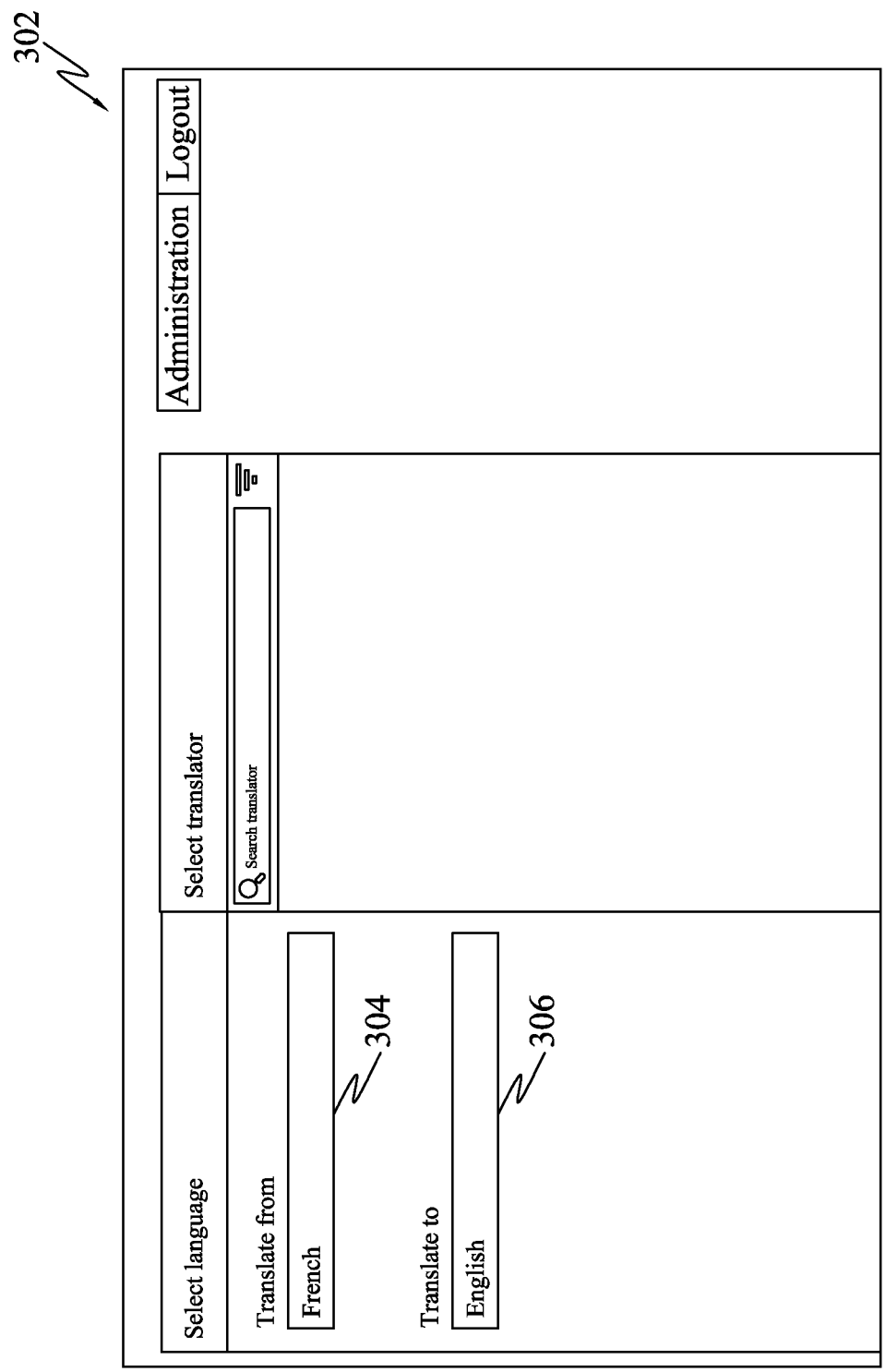
FIG. 3 is an exemplary user interface 302 of the application module 104 enabling reception of inputs indicating a first language and a second language from users of the device 102.

Upon input from a user expressing interest to initiate translation, for example by selecting the command 204 "translate", the application module 104 may direct the user to another interface 302 (refer FIG. 3). On the interface 302, the user may be allowed to provide input indicating to the language in which the voice input would be received and the language in which the translation of the voice input is desired.

Referring to FIG. 3, the application module 104 provides a user interface 302 on the device 102, enabling reception of inputs from users of the device 102. The user interface 302 provides one or more fields (304, 306) for receiving inputs. The application module 104 may receive input identifying a first language of an audio input. The audio input may be received from and entity (or entities) when he speaks into the audio input device 110. The entity for example can be a patient communicating with a doctor. Further, the application module 104 receives input identifying a second language into which the audio input in the first language is to be translated. The second language is the language in which the entity, for example, healthcare professional, communicating with the entity providing the audio input, seeks translation. The second language may be any language other than the first language. The second language may be same as the first language if only transcription, without translation is sought.

User interface 302 may include a field 304 with a title "translate from". "Translate from" indicates the language in which the audio input would be received (to a large extent), that is the first language. Further, the user interface 302 may include a field 306 with title "translate to". "Translate to" indicates the language into which the audio input in the first language is to be translated. The application module 104 may be configured to provide a drop down menu from which the inputs can be selected.

Alternatively, the user of device 102 is enabled to provide inputs in the field 304 titled "translate from" and "translate to" by typing into the field 304. Further, the application module 104 may be configured to provide suggestions as the user types. Further, one or more of the fields (304, 306) may be pre populated with appropriate inputs specific to the user of the device 102 or the entity providing audio input in the first language.

In another embodiment, the entity/entities providing the audio input in the first language (e.g. the patient) may be enabled to provide inputs in the field 304 titled "translate from".

In yet another embodiment, the device 102 may be connected to the audio input device 110. The audio input device 110 is capable of capturing voice input from one or more entities providing the audio input in the first language. The application module 104 may be configured to receive the voice input and identify the language of the input. The application module may be configured to populate the "translate from" field 304 on event of successful identification of the language in which the voice input is received through the audio input device 110. The "translate to" field 306 may be filled in by the user (healthcare professional). The application module 104 may suggest language(s) to populate the "translate to" field 306. The application module 104 may further be configured to provide a drop down menu from which the input for the "translate to" field 306 may be selected.

In an embodiment, if the user is dealing with a patient which the application module 104 does not recognize (no previous history corresponding to language preference), the application module 104 may not provide suggestions to populate the "translate from" field 304, or may provide suggestion based on general trend. However, for a patient whose language preference history may be available to the application module 104, the module 104 may pre-populate the "translate from" field 304 based on the history, with an option to change selection.

In an embodiment, the "translate to" field 306 may be pre populated with input specific to the user's preferred language. Such information may have been saved in the memory of the application module 104 from previous activities or may have been fed by the user earlier.

In an embodiment, examples of languages that may be entered in the "translate from" field 304 and the "translate to" field 306 may include, but not limited to English, Portuguese, Turkish, Italian, French/Creole, Spanish, German, Mandarin, Japanese, Czech, Finnish, Swedish, Korean and Dutch.

In an embodiment, the fields 304 and 306 may include options to enter "sign language" as a preferred language input.

The application module 104 may be configured to access the database of human translators 108. The application module 104 may include instructions to determine the availability of one or more human translators capable of translating the first language into the second language and second language to the first language.

In an embodiment, the application module 104 receives information corresponding to availability and status of a translator. The status of a translator may be free (available/online), busy or off mode (offline). "Free" status is when the translator is logged in and is waiting for an assignment, "busy" status is when a session token is open for the translator (carrying out a translation/transcription assignment), and "off" status is when the translator has logged out.

Profiles of human translators may be stored in the databases 108. The profile of a translator may include the language(s) from which the translator can translate and the language(s) to which the translator can translate and standard speech recognition software can transcript. Further, the database 108 may also include profiles of human translators capable of communicating in sign language. The translators may log into an online platform and become available online. The platform may be a part of the application module 104. The platform may be connected to the database of human translators 108.

In an embodiment, a network of skilled live sign language translators enrolled in an internet enabled network may be stored in the database 108. Translation of input (audio or text) into sign languages may be required for some patients. In an instance where sign language translation might be required, one of the entities (the health care professional or the patient) may access the network through a user interface provided on device 102 and search/request for a human translator, capable of translation of audio or text input into sign languages. If a human translator with these capabilities is available, the available human translator may accept the request to translate and communicate between the entities (health care professional and patient). As an example, the translator communicates what the patient is saying from sign language to a language (first language or second language) preferred by the health care professional. Likewise, the translator communicates the health care professional's speech/words, received in either the first or the second language, in sign language, to the patient.

The application module 104 after having received the requirement input corresponding to languages (example: first and second languages), can search in the database 108 for translators who meet the requirement. In an embodiment, one or more translators capable of translating form the first language to the second language may be shown as "available" (online) or "busy" or "off" (offline).

In an embodiment, only translators who meet the requirement and available may be displayed.

In another embodiment, only translators who meet the requirement and available or busy may be displayed.

In yet another embodiment, only translators who are capable of communicating in sign language may be displayed.

In case a human translator is available, then the assignment of translation may be assigned to the human translator which is followed by standard speech transcription software. The audio input in the first language captured by the audio input device 110 may be communicated to the available human translator. The audio input may be communicated to the human translator in the form of at least one of audio and text (transcript). A machine may convert the audio input to text.

The human translator may translate the input, for example from the first language to the second language. The application module 104 may be configured to receive the translated content from the human translator. The content received from the human translator in the second language may be in the form of transcript. Alternatively or additionally, content received from the human translators in the second language may be in the form of voice. The transcript may be presented on the device(s) 102.

In another embodiment, the human translator enters the translated content as audio input, which may be machine-converted into text.

In yet another embodiment, the human translator provides output in sign language.

In an embodiment, as explained above, input in the second language may be translated to the first language, and transcribed. Hence, as an example, both doctor and patient can understand each other.

Figure 4A:
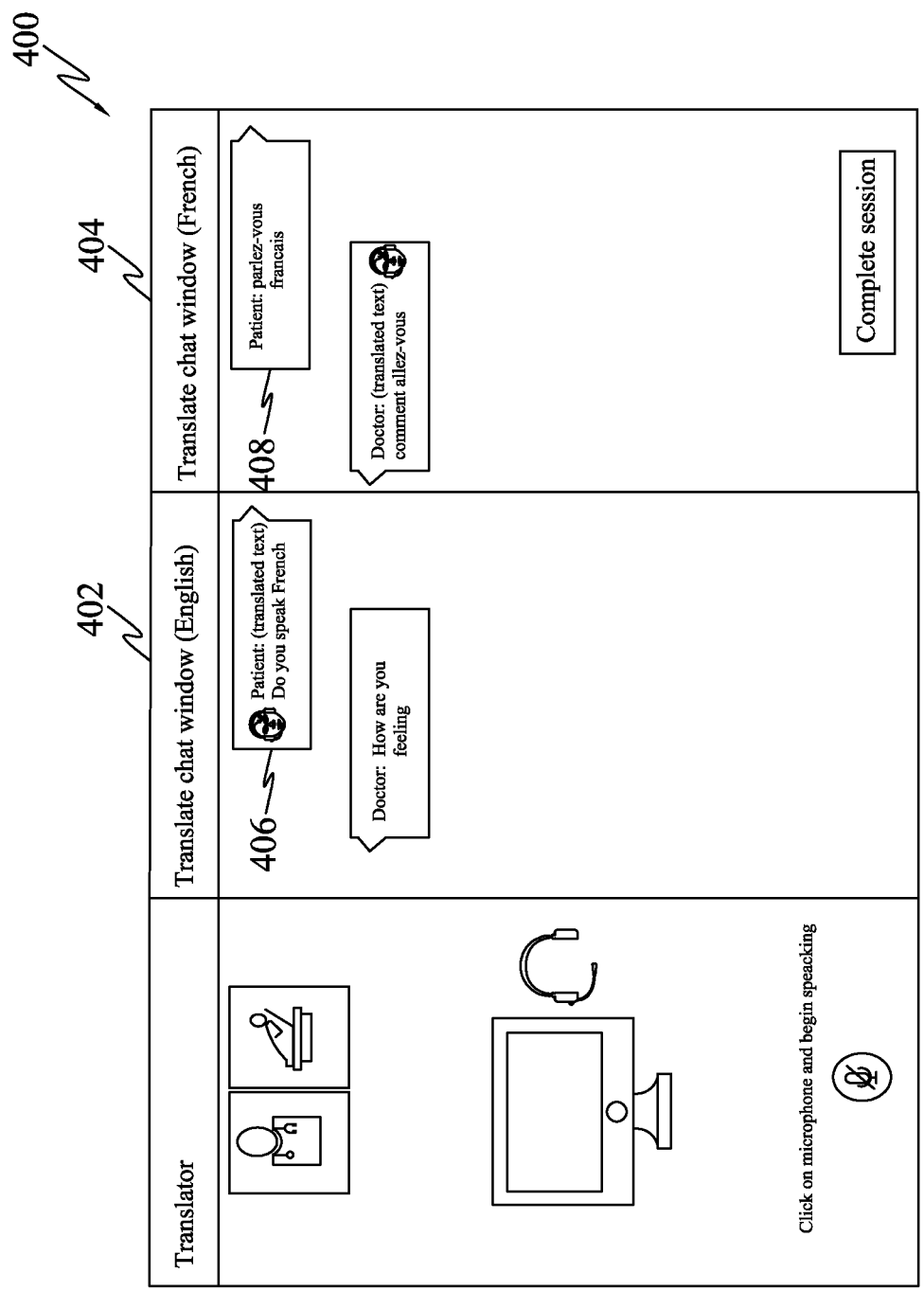
FIG. 4A is an exemplary illustration of the transcript in the first and the second languages being displayed on the device(s) 102 in a user interface 400.

Referring to FIG. 4A, the application module 104 may provide instructions to display the transcript in the first and the second languages on the device(s) 102 in the user interface 400.

In an embodiment, the healthcare professional and the patient views a single device 102 to understand each other. As an example, if the healthcare professional communicates in English and the patient communicates in French, the chat window 402, wherein the transcript is in English is referred by the healthcare professional, and the chat window 404, wherein the transcript is in French is referred by the patient.

The transcript in the first language and the transcript in the second language are arranged to visually associate correlating content. As an example, the chat boxes 406, 408 that relate to the correlating content ("Do you speak French") are arranged next to each other such that a viewer can visually associate the content on the boxes 406, 408.

In an embodiment, the chat boxes indicate whether the content is being translated by a machine or a human translator. As an example, the chat box 406 has a microphone symbol, thereby indicating that the translation was carried out by a human translator. In case a machine has translated the content, then instead of the microphone symbol, a computer symbol may be shown.

Figure 4B:
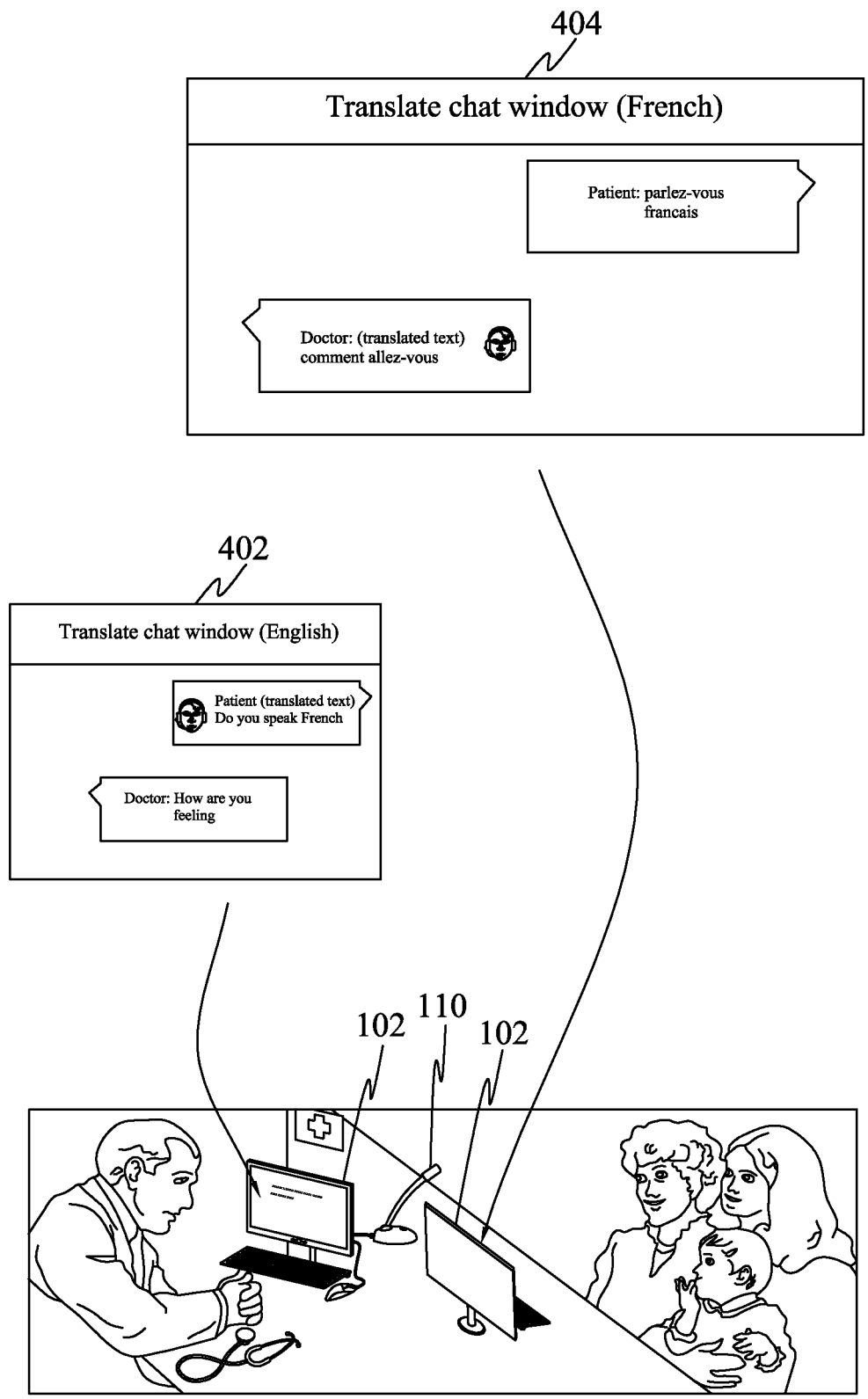
FIG. 4B is an exemplary illustration of a healthcare professional and a patient each viewing a different device 102.

In an alternate embodiment, referring to FIG. 4B, the healthcare professional and the patient may each view a different device 102. At least the chat window 402, which is in English is displayed in the device 102 facing the healthcare professional, and at least the chat window 404, which is in French is displayed in the device 102 facing the patient.

As the translation is in progress, both entities (health care professional and the patient) are able to view real time transcription on their devices 102. Further, the entities may be provided options to enter (type in or speak) input indicating edits that might be required. Both entities may provide inputs either verbally or through texts. As an example, the health care professional may speak the input indicating edits to the audio input device 112 verbally and also through a keyboard. The patients may instruct the human translator to have the edits done by the translator verbally.

In an embodiment, the device 102 may include more than one display screens such that one of the display screens is viewed by the healthcare professional and another one of the display screens may be viewed by the patient. Examples of device 102 with more than one display screens include devices with dual display monitor.

In an embodiment, a single audio input device 110 may be used by both the entities. The voice captured through the microphone may be converted to text/transcript and displayed on the device 102. The transcript received on the device 102 may also be in the first language. The transcript may be a result of speech to text conversion enabled by the audio input device 110. The audio input device 110 may be, for example, a Nuance Power Mic II Dictaphone or any similar device.

In an embodiment, the input device 110 is configured to be operably toggled, thereby enabling at least one of the human translator and a machine translator to identify the entity that is providing the audio input. Such identification enables the human or the machine translator to know the language in which the input will be received. As an example, if the input indicates that the healthcare professional will provide the input, then the input is expected in English. On the other hand, if the input indicates that the patient will provide the input, then the input is expected in French.

The toggle may be provided physically on the input device 110, wherein one of the positions indicates input from one entity (healthcare professional, thereby English), whereas another position indicates input from another entity (patient, thereby French).

Alternatively, the toggle may be software enabled. Referring to FIG. 4A, in the user interface 402, touching the doctor icon may indicate that the input would be in English, whereas touching the patient icon may indicate that the input would be in French.

In yet another alternative, referring to the user interface 402, if a healthcare professional touches on the microphone icon on his device, then the same indicates that the input would be in English. On the other hand, if a patient touches on the microphone icon on his device, then the same indicates that the input would be in French.

Figure 5:
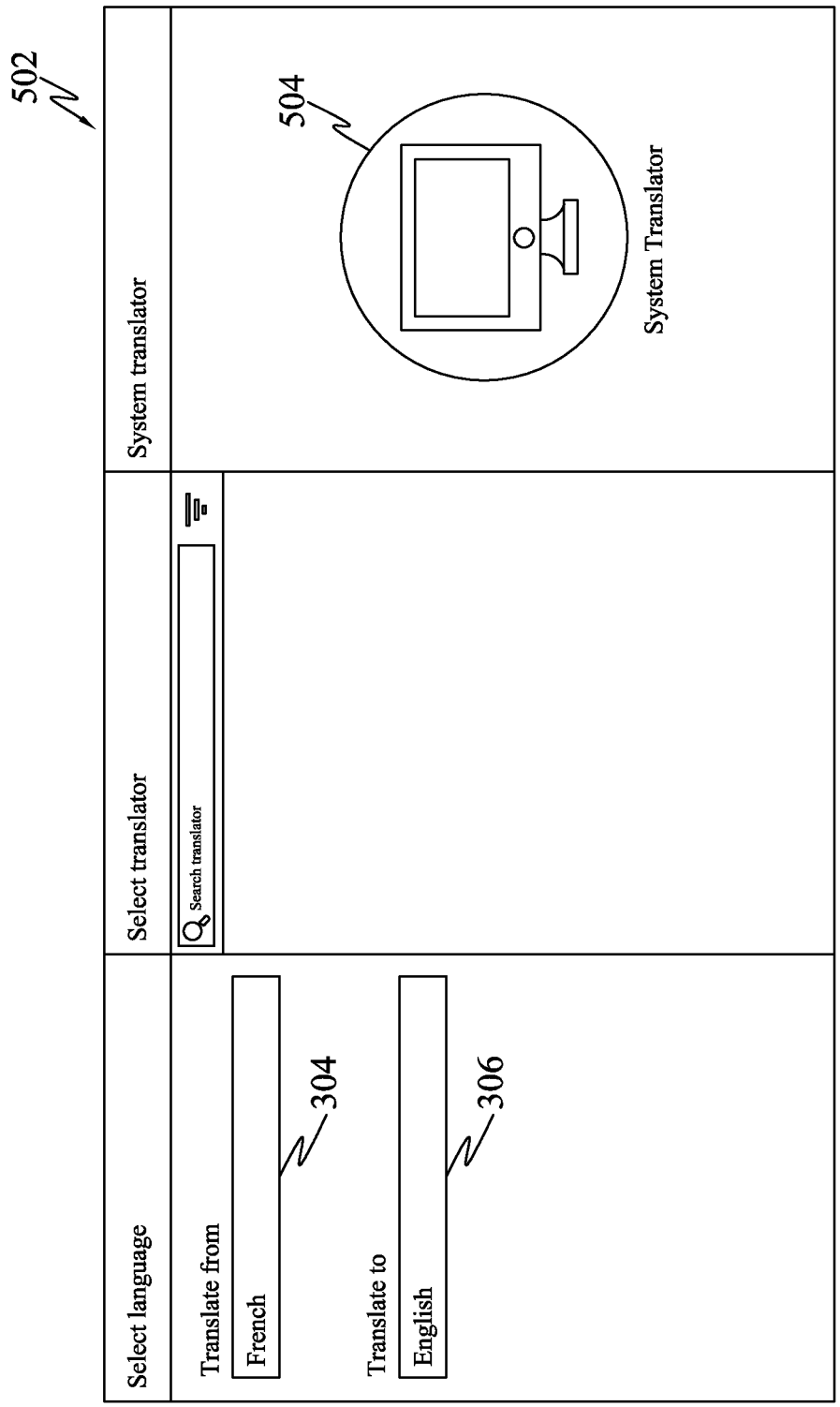
FIG. 5 is an illustration of an interface 502, thereby allowing the user to provide input enabling selection of machine/system translation.

Referring to FIG. 5, the application module 104 may be configured to provide an interface 502, thereby allowing the user to provide input, as an example by selecting system icon 504, and indicating selection of machine/system translation. The system 100 is configured to provide machine translation and transcription of the voice input when a human translator is either in a busy state or an off state.

In an embodiment, upon enabling selection of machine translation, the application module 104 may establish connections with one or more machine translation modules 114 providing speech recognition and translation with transcription applications, such as Google Speech Recognition API and Google Translate.

In an embodiment, the application module 104 may be configured to receive content in the second language as machine translations from the machine translation module 114. The content received as machine translations in the second language may be in the form of transcripts. Alternatively, content received as machine translations in the second language may be in the form of voice. The voice and transcripts may be presented by the device(s) 102.

Further, audio input in the second language captured by the audio input device 110 may be communicated to the machine translation module 114. The application module 104 may be configured to receive content corresponding to the audio input, in the first language from the machine translation module 114.

In an embodiment, a machine based translation may be configured to communicate transcripts corresponding to the audio input. The machine translation module 114 may be configured to convert the transcript into speech and communicate the translated speech to the application module 104. Alternatively, the machine translation module 114 may be configured to convert speech into transcripts and communicate the transcript to the application module 104.

In an embodiment, machine translation may be temporarily terminated when a human translator with the requisite capabilities appears available to the system 100. During an ongoing session based on machine translation, if a human translator becomes available, the application module 104 may be configured to terminate the machine translation source and select human translator for the translation. Alternatively, the application module 104 may provide option to the user of device 102 to terminate a machine translation session and provide input indicating selection of human translator.

Figure 6:
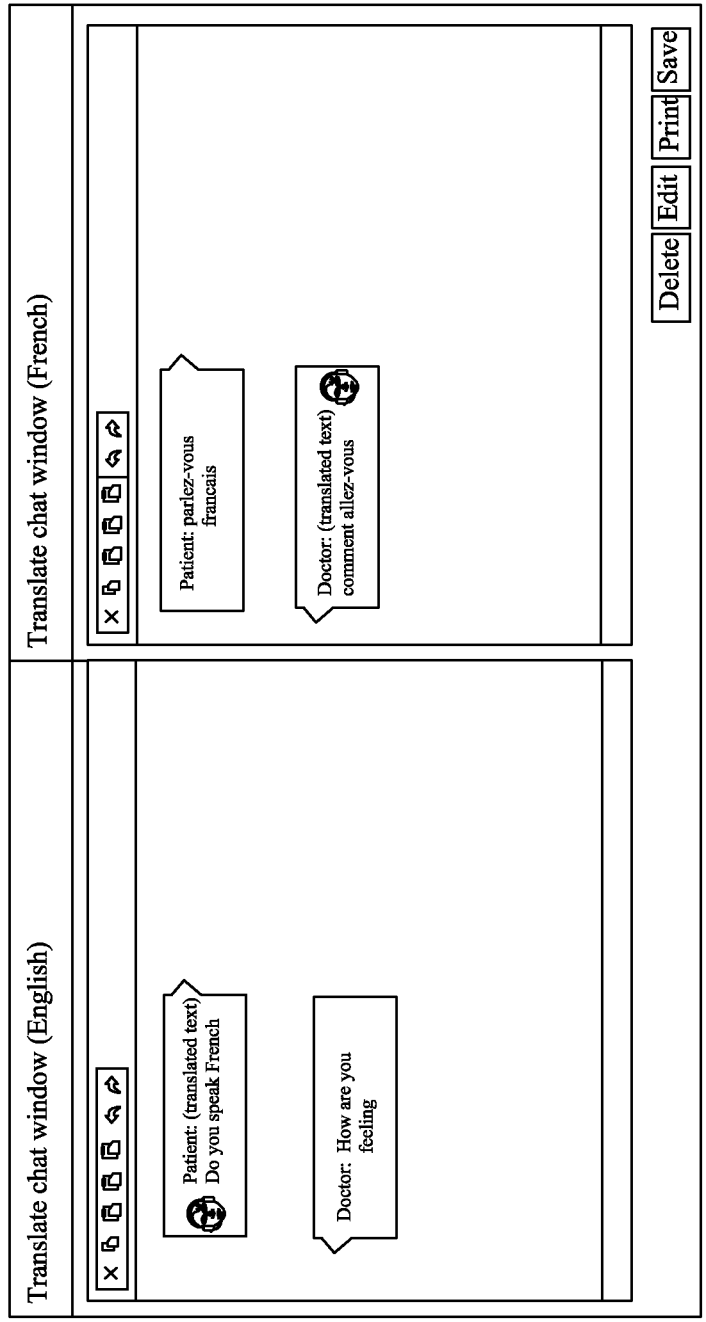
FIG. 6 is an illustration of an exemplary user interface 602 including option to print, save or delete the transcript.

Referring to FIG. 6, once a session is completed, the user may be provided with a user interface 602, wherein the interface 602 includes option to print, save or delete the transcript.

In another embodiment, the user may be provided with an option to save audio input corresponding to the conversation between the health care professional and the patient in the first language and in the second language. Further, translated audio output received from the human translator or as machine translation may be saved. Video corresponding to the audio content may also be saved. A video of the conversation corresponding to sign language may be recorded and saved to the patients chart for future references. The application module 104 may have options to enable recording of content received from the audio input device 110 and the display device 102.

In an embodiment, the application module 104 may be configured to provide an option to the user of the device 102 to edit the content of the transcript. Both entities may be provided options on their respective devices 102. Any edits may be provided as input by any of the entities (health care professional and/or the patient) either verbally by speaking the edits to the audio input device 112. Further edits may also be provided through the keyboard of device 102. The patients are provided with options to edit content as they are transcribed by speaking directly to the translator verbally. The translation will be displayed in both languages. Inputs are received from both entities (health care professional and patient) to ensure the translation is accurate. Edited content is saved into the patient's chart and progress notes. Editorial changes by both the doctor and the patient to the translation software will be entered into the progress notes archive.

In an embodiment, the application module 104 is configured to associate the transcript with the identity of the patient. The records of the transcripts and the audio and video content may be accessible to the health care professional dealing with the patient. Further, records of the transcripts and the saved audio and video content may be provided to the patient as the patient's copy.

In an embodiment, upon the completion of the session, the transcripts may be encrypted while associating the transcripts with the identity of the patient. Techniques known in the art such as for example, MDS or other similar algorithms may be used for the encryption. The encryption may be private key or public key encryption. The encryption module 116 of the application module 104 may be configured to provide the encryption of the transcripts. Alternatively, the encryption may happen at a remote server or at the local hospital server.

III. Method for Enabling Translation of Speech

Figure 7:
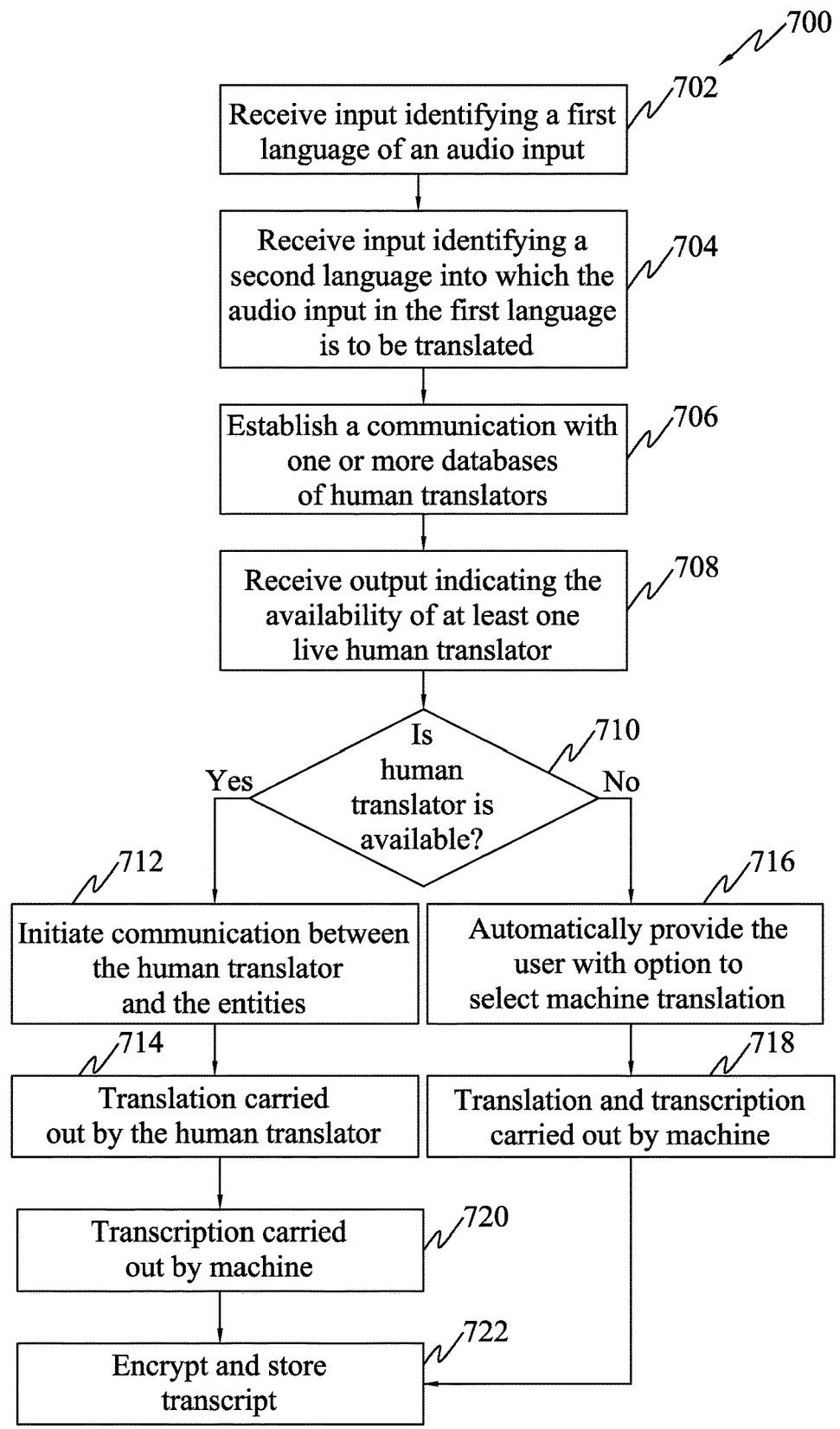
FIG. 7 is an exemplary method 700 for enabling translation of speech.

Now referring more particularly to FIG. 7 a method 700 is provided for translation of speech. At step 702, the application module receives input identifying a first language of an audio input. At step 704, the application module 104 receives input identifying a second language into which the audio input in the first language is to be translated. At step 706, the application module establishes a communication with one or more databases 108 of human translators. At step 708, the application module 104 receives output indicating the availability of at least one human translator. If the human translator is available, then at step 710, it is determined if at least one human translator is available. At step 712, communication begins between the human translator and the entities if at least one human translator is available. At step 714, translation is being carried out by the human translator.

If the human translator is busy or in off state, then at step 716, the application module 104 may automatically provide the user with option on the device 102 to select machine translation. At step 718, translation and transcription is being carried out by the machine.

Further, at step 720, a machine, similar to the audio input device 110, may provide transcripts corresponding to the translated voice output received from the human translator at step 714. The human translator may speak into the machine in the first or the second language, which in turn may convert the voice into transcripts. The transcripts may be viewed on the display devices 102.

In another embodiment, the human translator may also communicate transcripts to the application module 104, for viewing by the entities.

At step 722, the transcripts may be encrypted and stored with the patient's information, thereby associating the patient's identity with the transcripts.

Figure 8:
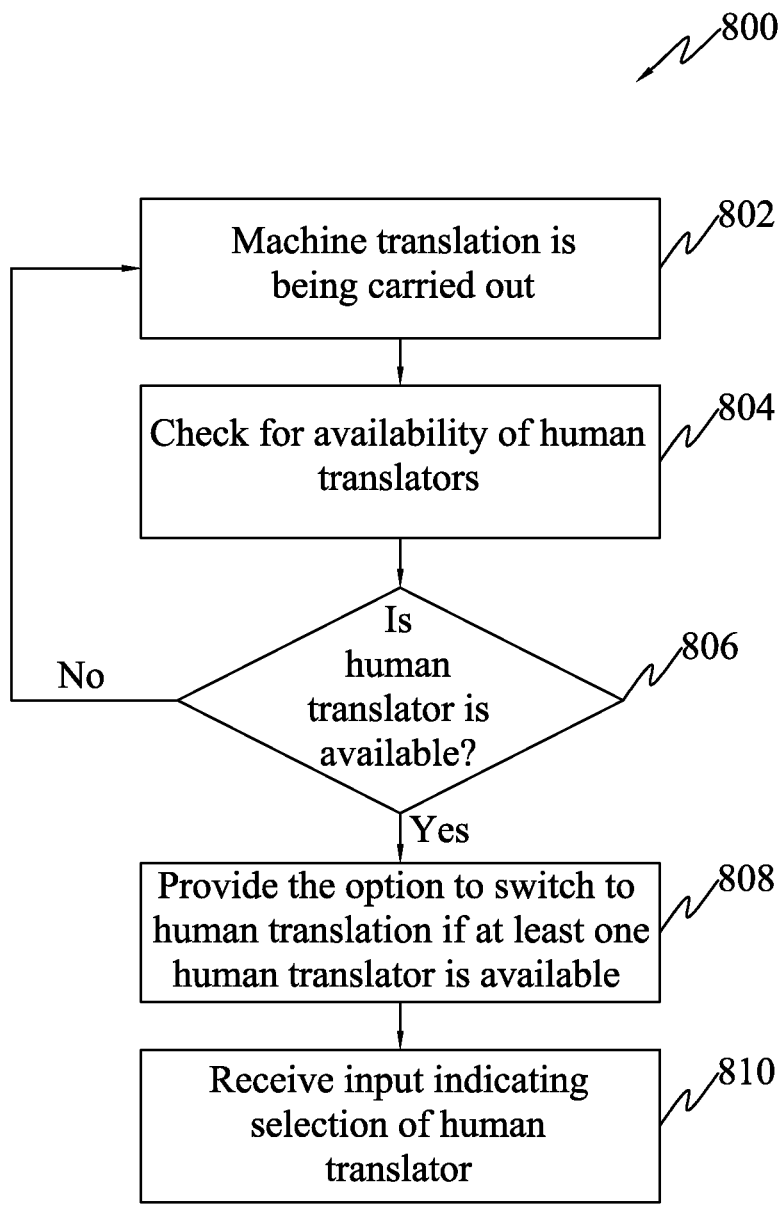
FIG. 8 is a flowchart illustrating a method 800 for checking available human translators during an ongoing session of machine translation.

Referring to FIG. 8, a flowchart illustrates a method 800 for checking available human translators during an ongoing session of machine translation. At step 802, machine translation is being carried out or is in process. At step 804, availability of at least one human translator is checked. At step 806, it is determined whether at least one human translator is available or busy or in an off state. If a human translator is available, then at step 808, the application module 104 may provide the option to switch to human translation if at least one human translator is available. Alternatively, the application module 104 may also enable the user to provide input indicating termination request of the machine translation. At step 810, option may be provided to the user to feed input indicating selection of human translator.

V. Conclusion

Martti™ (My Accessible Real-Time Trusted Interpreter) technology's product has shortcomings in case of unavailability of a qualified virtual translator. Embodiments address such shortcomings by providing a machine translator module to provide translations and transcriptions when a human translator is unavailable.

In Dragon Medical™ product, speech is recorded and transcribed electronically and then saved and stored into records. Embodiments provide a solution which not only provides transcripts and saves the transcripts but also saves translations in form of audio.

Embodiments provide system and method for enabling translation of speech in healthcare, banks, courts and hotels, among other industries.

Embodiments provide system and method for providing data identifying a first language of an audio input and data identifying a second language into which the audio input in the first language is to be translated, through a user interface of a device.

Embodiments provide system and method for searching for a human translator who is capable of translating from the first language to the second language and from the second language to the first language.

Embodiments provide system and method for providing the translation of audio input between two or more people in conversation with one another, speaking in the first language and the second language, by the human translator who is capable of translating from the first language to the second language and from the second language to the first language.

Embodiments provide system and method for switching the source of translation from human translator to machine translation when a human translator with the requisite capabilities is not available.

Embodiments provide system and method for providing transcripts corresponding to the audio input received in the first and the second language and the translated audio received from the human translator or as machine translation.

Embodiments provide system and method for providing options to enable saving, printing and editing the translated content and the transcripts.

Embodiments provide system and method for enabling communication in sign languages based on requirement.

The processes described above is described as sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

The invention claimed is:

1. A system for enabling translation of speech, the system comprising a processor and an application module configured to:
   receive input identifying a first language of an audio input;
   receive input identifying a second language into which the audio input in the first language is to be translated;
   determine availability of at least one human translator capable of translating the first language into the second language and translating the second language into the first language, in at least one database of human translators;
   receive from an available human translator, content in the second language, which has been translated using the audio input in the first language;
   receive machine translated content in the second language, which has been translated using the audio input in the first language, if the at least one human translator capable of translating the first language into the second language is unavailable; and
   checking availability of at least one human translator while machine translation is ongoing, and providing an option to switch to human translation if at least one human translator is available.

2. The system of claim 1, wherein the application module is further configured to receive the input identifying the first language and the input identifying the second language from a user's device.

3. The system of claim 1, wherein the available human translator is connected remotely over a network to an entity providing audio input in the first language and an entity seeking translation to the second language.

4. The system of claim 1, wherein the application module is further configured to transcribe the audio input.

5. The system of claim 4, wherein the transcribing of the audio input generates a transcription in the first language and a transcription in the second language.

6. The system of claim 5, wherein the transcription in the first language is machine transcribed and the transcription in the second language is transcribed by the available human translator, if the available human translator is available, else the transcription in the second language is machine transcribed.

7. The system of claim 5, wherein the application module is further configured to enable an entity seeking translation to edit a transcript.

8. The system of claim 5, wherein the transcription in the first language and the transcription in the second language are arranged to visually associate correlating content.

9. The system of claim 1, wherein the application module is further configured to output the machine translated content in the form of transcript and audio output.

10. The system of claim 9, further comprising one or more sets of instructions for enabling encryption of transcripts.

11. The system of claim 10, wherein the application module is configured to associate an encrypted transcript with an identity of a patient.

12. The system of claim 1, wherein the audio input is received through an input device, wherein the input device is configured to receive audio input from an entity providing audio input in the first language and an entity seeking translation to the second language.

13. The system of claim 12, wherein the input device is configured to be operably toggled, thereby enabling at least one of a human translator and a machine translator to identify the entity providing audio input in the first language.

14. The system of claim 1, wherein the application module is configured to provide an option to an entity seeking translation to the second language to select machine translation of the audio input in the first language.

15. The system of claim 1, further comprising one or more devices configured to at least enable viewing of a transcript in the first language, wherein
the transcript corresponds to the audio input, wherein the audio input is provided either by an entity providing audio input in the first language or an entity seeking translation to the second language;
the transcript corresponds to voice input received in the first language and the second language; and
the transcript is received from the available human translator or as a machine translation.

16. The system of claim 15, wherein the one or more devices are further configured to enable viewing of transcripts in the second language.

17. A computer-implemented method for enabling translation of speech, the method comprising:
determining availability of at least one human translator capable of translating a first language into a second language and input in the second language into the first language, in at least one database of human translators;
allocating a task of translating input in the first language into the second language and the input in the second language into the first language to an available human translator if a human translator is available;
allocating a task of translating the input in the first language into the second language and the input in the second language into the first language to a machine translator if a human translator is not available; and
checking availability of at least one human translator while machine translation is ongoing, and providing an option to switch to human translation if at least one human translator is available.

18. The method of claim 17, further comprising enabling encryption and storing of transcripts, wherein the encryption is at least provided at an application module.

19. A non-transitory computer readable medium having stored therein a set of instructions for enabling translation of speech, wherein the set of instructions when executed by a processor causes the processor to performs steps comprising:
receive input identifying a first language of an audio input and a second language into which the audio input in the first language is to be translated;
allocate a task of translating input in the first language into the second language and input in the second language into the first language to a human translator if the human translator is available;
allocate a task of translating the input in the first language into the second language and the input in the second language into the first language to a machine translator if the human translator is not available; and
check availability of at least one human translator during an ongoing session of machine translation, and providing an option to switch to human translation if at least one human translator is available.

* * * * *